United States Patent Office

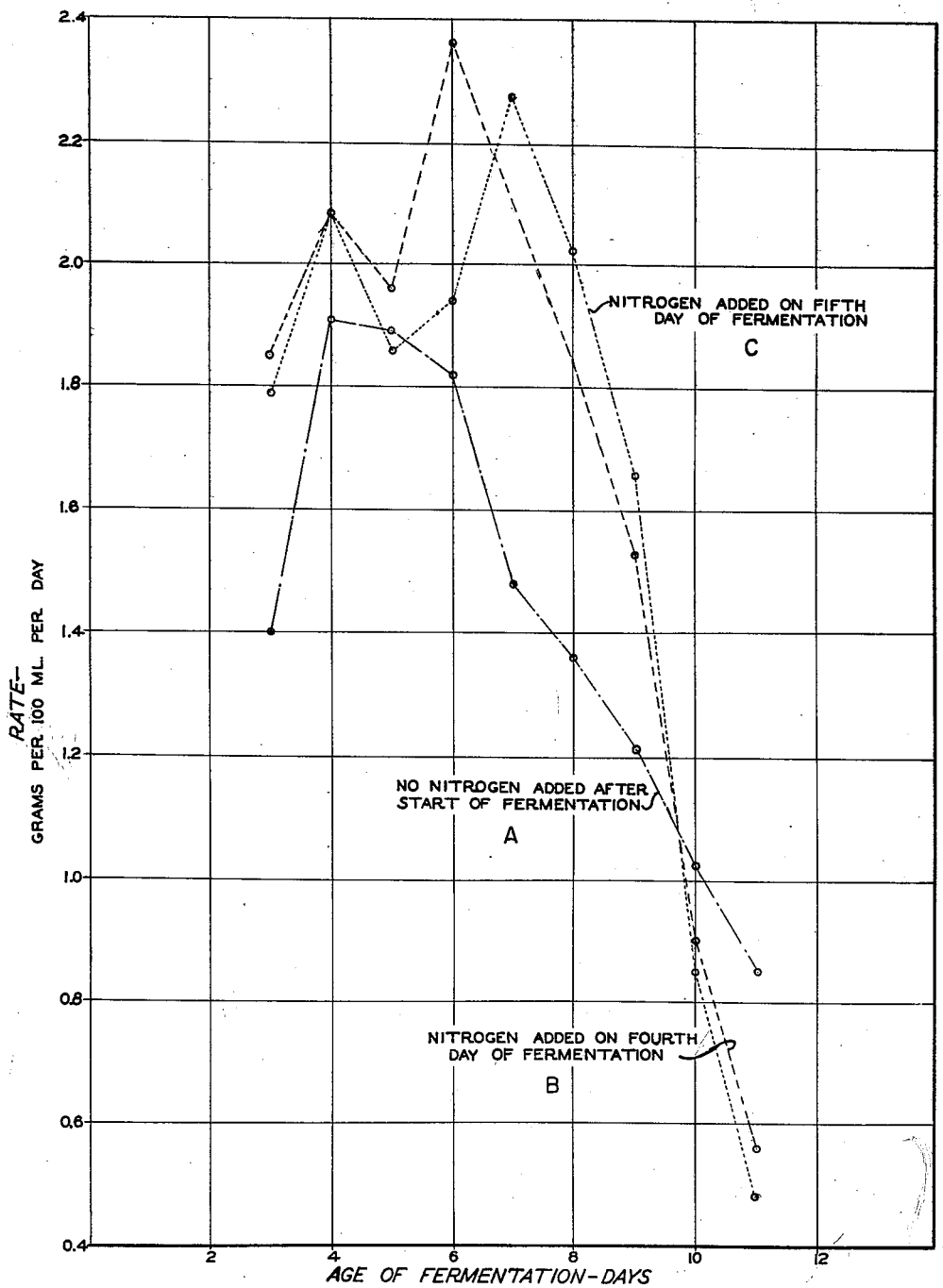

3,083,144
Patented Mar. 26, 1963

3,083,144
METHOD OF PRODUCING CITRIC ACID BY FERMENTATION
Merrick W. Shepard, Elkhart, Ind., assignor to Miles Laboratories, Inc., Elkhart, Ind., a corporation of Indiana
Filed Apr. 4, 1960, Ser. No. 19,881
7 Claims. (Cl. 195—36)

This invention relates to the production of citric acid from carbohydrate containing materials by submerged vegetative fermentation methods. More specifically, this invention relates to a method for improving the yield of citric acid in a submerged fermentation process. In one of its more particular aspects this invention relates to the nutrition of citric acid producing fungi.

Citric acid has been produced in commercial quantities by the fermentation of carbohydrate materials using various strains of citric acid producing fungi. Certain strains of *Aspergillus niger* have proved to be particularly useful for this purpose. In addition, various strains of other species of fungi such as *Aspergillus clavatus, Aspergillus wentii, Aspergillus luchuensis, Penicillium citrinum, Penicillium luteum, Mucor piriformis* and others have been used with varying degrees of success.

In such citric acid fermentations it has been found essential to provide the citric acid producing organism with certain nutrients such as nitrogen, phosphorus, potassium and magnesium, which are required for growth of the organism and for stimulation of production of citric acid. In general a suitable fermentation medium may be prepared by addition to a fermenter of the carbohydrate to be fermented together with the various nutrient materials. The fermentation medium or broth is then inoculated with spores of the organism being used. Fermentation is allowed to proceed under carefully controlled conditions of temperature and pH for a period of time sufficient to obtain useful yields of citric acid. In this process it is generally found that the rate of production of citric acid increases steadily with passage of time until the rate reaches a maximum after which the rate of production of citric acid begins to fall off. In a few days the rate has fallen to a point at which production is no longer economical.

It is a major object of this invention to prolong the length of time during which citric acid production proceeds at a useful and economical rate.

Another object of this invention is to provide a process for the production of citric acid which is capable of producing increased yields of citric acid.

A further object of this invention is to provide a process for production of citric acid which utilizes a larger proportion of the carbohydrate material used for fermentation.

Other objects and advantages of this invention will become apparent in the course of the following detailed disclosure and description.

This invention consists broadly in the addition of a nitrogen nutrient to the citric acid fermentation broth at a time subsequent to the beginning of fermentation. More particularly, this invention concerns nitrogen addition at a point in the fermentation cycle after the development of citric acid producing mycelia.

In accordance with the improved process of this invention it is generally possible to increase the yield of citric acid by the addition of a suitable nitrogen source at any time subsequent to the development of citric acid producing mycelia. It is desirable to add the nitrogen nutrient at a point in the fermentation cycle near where the rate of production of citric acid begins to drop off from the maximum. This point may vary from batch to batch and is, of course, dependent upon the make-up of the fermentation medium and the fermentation conditions. However, this point can be readily ascertained by analysing samples from a control run of citric acid production in which no nitrogen is added after the fermentation begins. By determining the rate of citric acid production at various times during the fermentation cycle, and plotting this rate against the age of the fermentation it is possible to determine the point of maximum rate of citric acid production and thereby the point at which the nitrogen nutrient should be added. It should be pointed out, however, that while this procedure is desirable it has been found that enhanced production of citric acid is accomplished by nitrogen additions throughout the course of fermentation starting at any time after the first stage of growth of the citric acid mycelia. For example, additions from the third through the ninth day of the fermentation cycle have proved effective to produce greatly improved yields of citric acid and considerably more satisfactory utilization of the carbohydrate feed. In particular, additions of nitrogen nutrient from about the third day of fermentation to about the seventh day have proved eminently satisfactory for this purpose.

It will be appreciated that the nitrogen nutrient selected for addition to the fermentation medium at this time is in addition to any nitrogen which may have been originally charged to the fermentation medium. Such initial charge, which is present before development of citric acid producing mycelia, has been found to be generally effective to promote a certain amount of growth of the mycelia. However, it is now known that this initial charge is not effective to cause production of optimum yields of citric acid, yet the mere increasing of the concentration of nitrogen originally charged does not have the desired effect either. It is only by following the practice of the present invention, namely by feeding to the fermentation medium an effective quantity of nitrogen at a stage during the fermentation at which utilization of the increased concentration of nitrogen is possible that optimum yields of citric acid and corresponding utilization of the carbohydrate medium are obtained.

The nitrogen nutrients used for the purpose of this invention are compounds which are capable of furnishing ammonium ions to the fermenting broth. For example, ammonia, both in gaseous and aqueous form, ammonium hydroxide and ammonium carbonate may be used as the nitrogen nutrient. The commercial grade of ammonium carbonate, which is satisfactory for use for this purpose, is actually a mixture of ammonium bicarbonate and ammonium carbamate. Other compounds which serve as a source of the ammonium ion may also be used in the process of this invention. Such compounds include, for example, other ammonium salts such as ammonium nitrate, ammonium sulfate and ammonium chloride, which are also capable of furnishing ammonium ions. Ammonia is preferred for this purpose because of the ease of handling and convenience of use of the various forms of ammonia.

The concentration of nitrogen nutrient added during the fermentation may be varied in accordance with the composition of the fermentation medium and the conditions of fermentation so that an amount of nutrient is used which is sufficient to maintain the maximum rate of production of citric acid beyond the point at which the rate normally would fall off. The addition of an amount of a nitrogen nutrient sufficient to give a concentration in the fermentation broth of from about 50 parts per million of nitrogen to about 5,000 parts per million of nitrogen is generally found adequate to insure stabilization of citric acid production at a high rate for an extended period of time. By virtue of this maintenance of high production rates it becomes possible to shorten the over-all times of fermentation and still realize economical yields of citric acid.

While it is not desired to postulate a mechanism which may be responsible for this observed increase in yield of citric acid, it is suggested that the additional source of nutrient nitrogen may result in metabolic changes in the citric acid producing organism so as to enhance its citric acid producing ability. It is known, for example, that there is a pronounced change in the morphorolgy of citric acid producing strains of *Aspergillus niger* after about 16 hours to about 20 hours of fermentation.

The drawing illustrates the effect of nitrogen additions upon rate of production of citric acid.

The invention will be better understood by reference to the following examples which, however, are not intended to unduly limit the scope of the instant invention, limitation of which is to be in accordance with the claims appended hereto.

EXAMPLE I

The fermentation medium was made up in accordance with the teachings of United States Patent No. 2,492,667 to Raymond L. Snell and Leonard B. Schweiger, and Patent No. 2,492,673 to John C. Woodward and Raymond L. Snell. The medium was prepared from Cuban high-test molasses which was defecated, decationized, filtered and made up to volume. The initial charge to the fermenter was as follows:

| | |
|---|---|
| Volume | 16,500 gal. |
| Sugar | 22,050 lb. (16.08%). |
| Iron | 0.40 p.p.m. |
| Potassium acid phosphate | 18.75 lb. (137 p.p.m.). |
| Magnesium sulfate | 133 lb. (966 p.p.m.). |
| Calcium chloride | 12 lb. (87 p.p.m.). |
| Copper sulfate (penta hydrate) | 48 g. |
| Zinc sulfate (anhydrous) | 34 g. |

After the nutrient elements were added to the deionized medium in the fermenter, the pH was adjusted from pH 1.4–1.6 by addition of ammonia to a pH within the range of pH 2.5–2.8. This required from about 400 parts per million to 700 parts per million of nutrient nitrogen. The fermenter was then inoculated with spores of *Aspergillus niger* Strain No. 139 according to standard practice, and the fermentation was allowed to proceed for five days. On the fifth day of fermentation 110 pounds of anhydrous ammonia (800 parts per million) was added. The fermentation medium was harvested after 12 days and the yield of citric acid was found to be 85.2%.

It may be seen from this example that a yield of over 85% was obtained using the process of this invention. Prior to use of the improvement of this invention, yields of from about 65% to 75% were considered satisfactory.

The following example illustrates the effect of nitrogen addition upon the rate of citric acid production.

EXAMPLE II

The fermentation broths were made up according to the procedure of Example I except that the range of sugar used was from 22,400 lb. to 25,300 lb. (16.3–18.4%) per batch, potassium acid phosphate was present in a concentration of 140 parts per million and magnesium sulfate was used at the 1,000 parts per million level. No ammonia was added after the start of fermentation. The rates of citric acid production (grams of citric acid produced per 100 ml. per day) for ten runs were averaged and the averages were plotted against the age of the fermentation in days. The results are shown in Table I and as curve A of the FIGURE.

Also shown in Table I are data for an average of ten runs in which 20 lb. (145 p.p.m.) of ammonia was added on the fourth day after the start of fermentation, which are plotted as curve B of the figure.

Data for an average of ten runs in which 145 p.p.m. of ammonia was added on the fifth day after the start of fermentation are also shown in Table I and plotted as curve C of the figure.

*Table I*

| Day Ammonia Added | Rate of Citric Acid Production (g./100 ml./day) on Selected Days after Start of Fermentation | | | | | | | | |
|---|---|---|---|---|---|---|---|---|---|
| | 3rd | 4th | 5th | 6th | 7th | 8th | 9th | 10th | 11th |
| None | 1.40 | 1.91 | 1.89 | 1.82 | 1.48 | 1.36 | 1.21 | 1.02 | 0.85 |
| Fourth | 1.85 | 2.08 | 1.96 | 2.36 | 2.09 | 1.84 | 1.53 | 0.90 | 0.55 |
| Fifth | 1.79 | 2.08 | 1.86 | 1.94 | 2.27 | 2.02 | 1.66 | 0.85 | 0.48 |

From these data and from a comparison of the curves plotted in the figure it can be seen that addition of ammonia on the fourth or the fifth day not only prolongs the rapid rate of citric acid production and thereby decreases the length of the fermentation cycle but also leads to a higher rate than occurs without ammonia addition. The maximum rate is seen to occur about two days after ammonia addition.

The following example illustrates the improved rates of production of citric acid achieved through the use of ammonium carbonate in the process of this invention.

EXAMPLE III

The fermentation media were made up according to the procedure of Example I except that the media contained 17.63% reducing sugars, 0.25 parts per million iron, 0.1 parts per million Zn$^{++}$ and 200 parts per million of nitrogen as ammonium carbonate at pH 2.72. The data obtained are shown in Table II.

*Table II*

| Ammonium Carbonate Added | | Rate of Citric Acid Production (g./100 ml./day) on Selected Days after Start of Fermentation | | | | | | | | |
|---|---|---|---|---|---|---|---|---|---|---|
| Days | p.p.m. | 2nd | 3rd | 4th | 5th | 6th | 7th | 8th | 9th | 10th |
| Control | 0 | 0.75 | 1.25 | 1.17 | 1.10 | 1.10 | 0.87 | 0.62 | 0.80 | 0.52 |
|  | 4,000 | 0.65 | 1.25 | 1.32 | 1.10 | 1.15 | 1.07 | 0.82 | 0.82 | 0.82 |
| 2 | 2,000 | 0.45 | 0.90 | 0.82 | 0.75 | 0.75 | 1.02 | 0.82 | 0.82 | 0.67 |
| 3 | 2,000 | 0.87 | 1.32 | 1.42 | 1.35 | 1.17 | 1.40 | 0.87 | 1.05 | 0.97 |
| 4 | 2,000 | 0.85 | 1.25 | 1.25 | 1.45 | 1.35 | 1.27 | 1.12 | 1.00 | 0.77 |
| 5 | 2,000 | 0.80 | 1.40 | 1.35 | 1.37 | 1.40 | 1.30 | 1.32 | 0.95 | 1.12 |
| 6 | 2,000 | 0.75 | 1.40 | 1.25 | 1.15 | 1.25 | 1.40 | 1.15 | 1.07 | 1.05 |
| 7 | 2,000 | 0.80 | 1.45 | 1.20 | 1.10 | 1.10 | 1.32 | 1.05 | 1.20 | 1.07 |
| 3 | 1,000 | 0.82 | 1.45 | 1.57 | 1.42 | 1.32 | 1.27 | 0.92 | 0.92 | 0.90 |
| 5 | 1,000 | 0.75 | 1.17 | 1.25 | 1.22 | 1.22 | 1.12 | 1.10 | 1.07 | 0.85 |
| 7 | 1,000 | 0.87 | 1.42 | 1.25 | 1.22 | 1.07 | 1.10 | 1.07 | 1.07 | 0.77 |
| 3 | 3,000 | 0.80 | 1.55 | 1.55 | 1.05 | 1.20 | 1.02 | 0.57 | 0.95 | 0.52 |
| 5 | 3,000 | 0.75 | 1.35 | 1.40 | 1.35 | 1.55 | 1.45 | 1.22 | 1.17 | 0.95 |
| 7 | 3,000 | 0.77 | 0.92 | 0.92 | 0.92 | 1.07 | 0.97 | 0.87 | 0.97 | 0.85 |

These data show that the rate of citric acid production is markedly increased by the addition of ammonium carbonate according to the process of this invention. The data for the run in which 4,000 parts per million of nitrogen as ammonium carbonate was added to the original fermentation medium and no nitrogen nutrient was added after the beginning of fermentation show that the addition of even twice as much nitrogen nutrient prior to the beginning of fermentation does not result in the improved rates of citric acid production which are observed for additions in accordance with the teachings of this invention.

The following example illustrates the use of ammonium hydroxide in the process of this invention and the remarkable results achieved thereby.

EXAMPLE IV

The fermentation media were made up according to the process of Example I, except that the media contained 17.06% initial sugar, 0.32 parts per million iron, 0.1 part per million $Cu^{++}$, 0.1 part per million $Zn^{++}$, and 540 parts per million of nitrogen as ammonium hydroxide. The data obtained are shown in Table III.

*Table III*

| Ammonium Hydroxide Added | | Rate of Citric Acid Production (g./100 ml./day) on Selected Days after Start of Fermentation | | | | | | | | |
|---|---|---|---|---|---|---|---|---|---|---|
| Days | p.p.m. | 3rd | 4th | 5th | 6th | 7th | 8th | 9th | 10th | 11th |
| Control | 0 | 1.20 | 1.45 | 1.35 | 1.32 | 1.27 | 1.17 | 1.17 | 0.82 | 0.70 |
| Control | 0 | 1.42 | 1.45 | 1.60 | 1.37 | 1.32 | 1.30 | 1.17 | 0.77 | 0.50 |
| Daily 3-10 | 90 | 1.40 | 1.55 | 1.67 | 1.50 | 1.52 | 1.65 | 1.57 | 0.22 | 0.22 |
| 3 and 8 | 540 | 0.72 | 0.75 | 0.60 | 0.87 | 1.22 | 1.12 | 1.00 | 1.12 | 0.87 |
| 3 and 8 | 270 | 0.77 | 0.87 | 1.00 | 1.17 | 1.45 | 1.27 | 1.25 | 1.25 | 0.70 |
| 3 | 270 | 1.07 | 1.30 | 1.42 | 1.50 | 1.52 | 1.50 | 1.42 | 0.45 | 0.07 |
| 3 | 540 | 0.95 | 1.17 | 1.32 | 1.47 | 1.67 | 1.67 | 1.37 | 0.67 | ---- |
| 5 | 270 | 1.25 | 1.45 | 1.45 | 1.52 | 1.55 | 1.55 | 1.35 | 0.50 | 0.27 |
| 5 | 540 | 1.40 | 1.52 | 1.45 | 1.60 | 1.70 | 1.77 | 1.40 | 0.42 | 0.15 |
| 7 | 270 | 1.20 | 1.42 | 1.35 | 1.30 | 1.15 | 1.50 | 1.20 | 0.77 | 0.22 |
| 7 | 540 | 1.20 | 1.32 | 1.37 | 1.32 | 1.20 | 1.57 | 1.77 | 0.87 | 0.30 |
| 9 | 270 | 1.32 | 1.47 | 1.47 | 1.45 | 1.20 | 1.22 | 1.00 | 1.15 | 0.45 |
| 5 | 540 | 1.30 | 1.52 | 1.20 | 1.52 | 1.37 | 1.52 | 0.95 | 0.65 | 0.20 |

These data show clearly that the rate of citric acid production is not only stabilized at an increased rate for an extended period of time by the addition of ammonium hydroxide in accordance with the teachings of this invention, but also that the rate of production of citric acid reaches a higher level through this addition of nitrogen nutrient.

In summary, this invention is directed to the improved process for the production of citric acid by the submerged vegetative fermentation of carbohydrates with citric acid producing strains of fungi, such as *Aspergillus niger*, wherein a nitrogen nutrient is added to the fermentation medium during fermentation at a time at which the addition of nitrogen is effective to increase and maintain the rate of citric acid production. As a result, yields obtained are greatly improved over yields previously attainable by the use of known submerged fermentation processes and fermentation times can be markedly reduced.

What is claimed is:

1. In a process for the production of citric acid which comprises subjecting a carbohydrate to fermentation with a citric acid producing strain of a fungus in the presence of nutrients for said fungus, said nutrients including a nitrogen nutrient, the improvement which comprises adding to the fermentation broth a quantity of a member selected from the group consisting of ammonia and ammonium salts as a nitrogen containing nutrient effective to stabilize the production of citric acid beyond the point at which said production normally tends to decrease, said addition being made at a time which is no earlier than about one day from the point of maximum rate of citric acid production in the absence of said added nutrient.

2. In a process for the production of citric acid which comprises fermenting a carbohydrate medium with a citric acid producing strain of a fungus, said carbohydrate medium containing nutrients including a nitrogen nutrient for said fungus, the improvement which comprises adding to said fermenting medium a quantity of a member selected from the group consisting of ammonia and ammonium salts as a nitrogen containing nutrient suffficient to furnish nitrogen in a concentration of from about 50 parts per million to about 5,000 parts per million, at a time from about the beginning of the third day of fermentation to about the end of the seventh day thereof.

3. In a process for the production of citric acid by submerged fermentation of a carbohydrate medium with a citric acid producing strain of *Aspergillus niger*, said medium containing nutrients, including a nitrogen nutrient, for said strain of *Aspergillus niger*, the improvement which comprises adding to the fermenting medium an amount of a member selected from the group consisting of ammonia and ammonium salts as a nitrogen containing nutrient effective to furnish to said fermenting medium a concentration of from about 50 parts per million to about 5,000 parts per million of nitrogen, said addition being made at a point in the fermentation cycle which is within about one day of the point of maximum rate of citric acid production in the absence of said added nutrient.

4. The process of claim 1 wherein the nitrogen containing nutrient is an ammonium ion furnishing nutrient.

5. The process of claim 1 wherein the nitrogen containing nutrient is ammonia.

6. The process of claim 3 wherein the nitrogen containing nutrient is ammonium hydroxide.

7. The process of claim 1 wherein the nitrogen containing nutrient is ammonium carbonate.

References Cited in the file of this patent

UNITED STATES PATENTS 2,394,031     Waksman et al.     Feb. 5, 1946
2,910,409     Fried et al.     Oct. 27, 1959